US012040832B2

(12) United States Patent
Xia et al.

(10) Patent No.: US 12,040,832 B2
(45) Date of Patent: Jul. 16, 2024

(54) SYSTEMS AND METHODS FOR MONITORING INTEGRITY AND RELIABILITY OF A NETWORK OF FIBER CABLES IN REAL-TIME

(71) Applicant: Verizon Patent and Licensing Inc., Basking Ridge, NJ (US)

(72) Inventors: Tiejun J. Xia, Richardson, TX (US); Glenn A. Wellbrock, Wichita, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 18/047,851

(22) Filed: Oct. 19, 2022

(65) Prior Publication Data

US 2024/0137118 A1  Apr. 25, 2024

(51) Int. Cl.
*H04B 10/079* (2013.01)

(52) U.S. Cl.
CPC . *H04B 10/07955* (2013.01); *H04B 10/07957* (2013.01)

(58) Field of Classification Search
CPC ............ H04B 10/07955; H04B 10/07957
USPC ............................................. 398/38
See application file for complete search history.

(56) References Cited

U.S. PATENT DOCUMENTS

| | | | | |
|---|---|---|---|---|
| 7,848,645 B2* | 12/2010 | Healey | ............ | H04B 10/85 398/16 |
| 10,491,296 B1* | 11/2019 | Wellbrock | ............ | H04B 10/073 |
| 2007/0264012 A1* | 11/2007 | Healey | ............ | H04B 10/079 398/13 |
| 2011/0013904 A1* | 1/2011 | Khermosh | ............ | H04B 10/071 398/16 |
| 2015/0048243 A1* | 2/2015 | Childers | ............ | E21B 47/135 250/269.1 |
| 2020/0116556 A1* | 4/2020 | Cedilnik | ............ | G01L 1/242 |
| 2021/0089830 A1* | 3/2021 | Invernizzi | ............ | G02B 6/4246 |
| 2021/0289272 A1* | 9/2021 | Ghuman | ............ | H04B 10/58 |
| 2022/0123833 A1* | 4/2022 | Desplat | ............ | G01M 11/3145 |
| 2023/0375377 A1* | 11/2023 | Ji | ............ | G01D 3/08 |

FOREIGN PATENT DOCUMENTS

CA          3020456 C  * 12/2020  ......... G01D 5/35303

* cited by examiner

*Primary Examiner* — Abbas H Alagheband

(57) ABSTRACT

A device may provide a signal with a first wavelength and a second wavelength to a fiber cable, and may receive an intensity change measurement of backscattered light based on the first wavelength of the signal. The device may receive a differential phase change measurement of the backscattered light based on the second wavelength of the signal, and may determine whether there is a fiber loss change, a fiber length change, and/or a fiber cut associated with the fiber cable based on the intensity change measurement. The device may determine whether there is an abnormal event associated with the fiber cable based on the differential phase change measurement, and may report one or more of the fiber loss change, the fiber length change, the fiber cut, or the abnormal event.

20 Claims, 11 Drawing Sheets

SYSTEMS AND METHODS FOR MONITORING INTEGRITY AND RELIABILITY OF A NETWORK OF FIBER CABLES IN REAL-TIME

BACKGROUND

To maintain the integrity of deployed fiber cables, network service providers need to perform maintenance on fiber cables at locations in the field. When a deployed fiber cable needs maintenance, a technician may be deployed to correct the issue.

DETAILED DESCRIPTION OF PREFERRED EMBODIMENTS

Figure 1A:
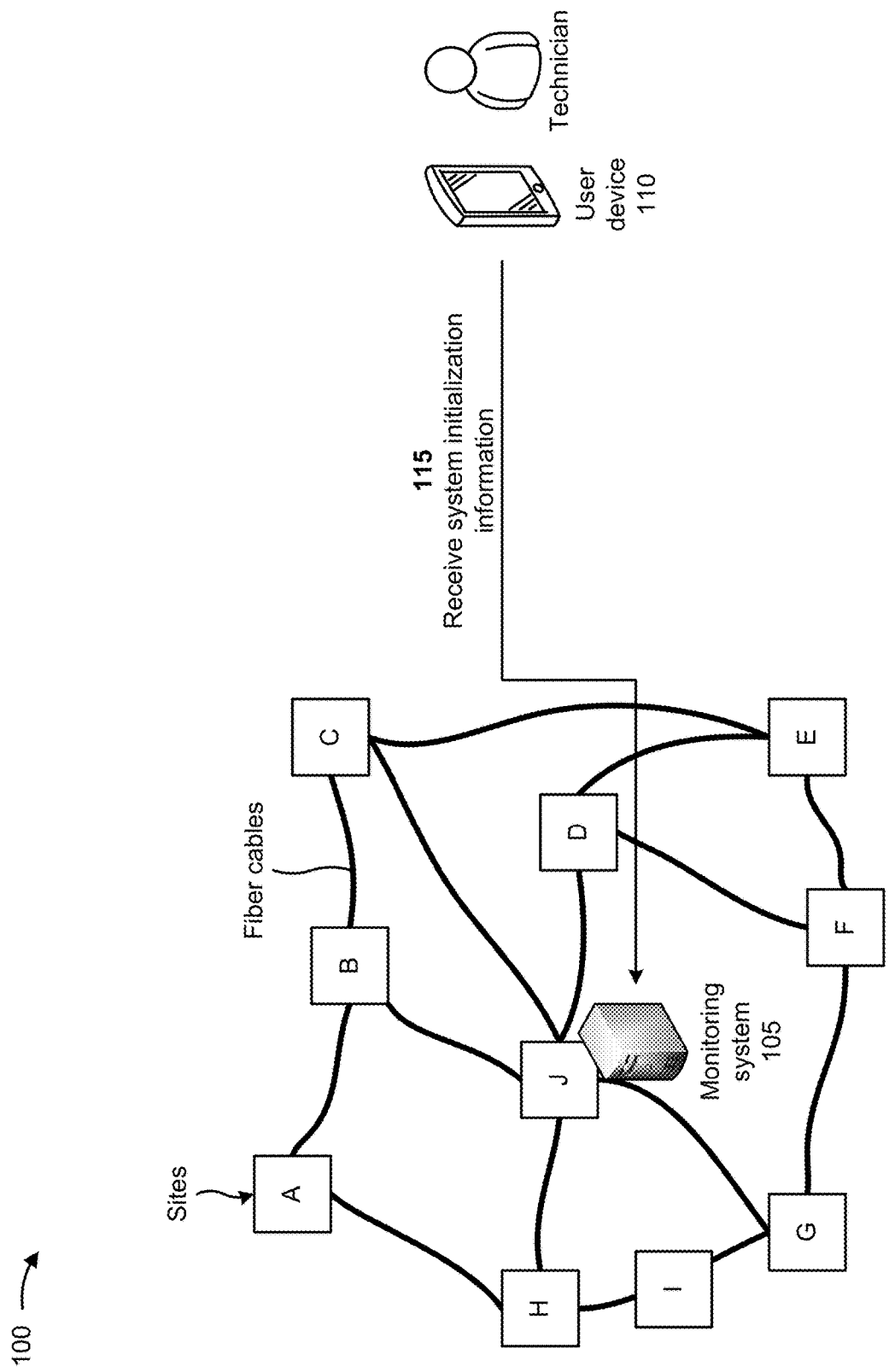
FIGS. 1A-1H are diagrams of one or more example implementations described herein.

The following detailed description of example implementations refers to the accompanying drawings. The same reference numbers in different drawings may identify the same or similar elements.

Technicians may utilize various devices to monitor a network of fiber cables when in the field. When monitoring a fiber cable, a technician may wish to determine whether the fiber cable has experienced a fiber loss change (e.g., reduced signaling in the fiber cable), a fiber length change, a fiber cut, an abnormal event (e.g., an activity near the fiber cable that may damage the fiber cables), and/or the like. However, monitoring the fiber cable for such situations requires the technician to travel to a location of the fiber cable and utilize various devices to determine whether the fiber cable has experienced a fiber loss change, a fiber length change, a fiber cut, an abnormal event, and/or the like. Thus, current techniques for monitoring deployed fiber cables at field locations consume computing resources (e.g., processing resources, memory resources, communication resources, and/or the like), networking resources, transportation resources, human resources, and/or the like associated with utilizing multiple devices to monitor a fiber cable, traveling to and monitoring the fiber cable, failing to identify issues with the fiber cable in real-time, recovering lost network traffic due to failing to identify issues with the fiber cable in real-time, and/or the like.

Some implementations described herein provide a monitoring system that monitors integrity and reliability of a network of fiber cables in real-time. For example, the monitoring system may provide a signal with a first wavelength and a second wavelength to a fiber cable, and the system may receive an intensity change measurement of backscattered light based on the first wavelength of the signal. The monitoring system may receive a differential phase change measurement of the backscattered light based on the second wavelength of the signal, and may determine whether there is a fiber loss change associated with the fiber cable based on the intensity change measurement. The monitoring system may determine whether there is a fiber length change associated with the fiber cable based on the intensity change measurement, and may determine whether there is a fiber cut associated with the fiber cable based on the intensity change measurement. The monitoring system may determine whether there is an abnormal event associated with the fiber cable based on the differential phase change measurement, and may report one or more of the fiber loss change, the fiber length change, the fiber cut, or the abnormal event based on the one or more of the fiber loss change, the fiber length change, the fiber cut, or the abnormal event being associated with the fiber cable.

In this way, the monitoring system monitors an integrity and a reliability of a network of fiber cables in real-time. The monitoring system may monitor an intensity of backscattered light from a fiber cable and a differential phase change of the backscattered light from the fiber cable. The monitoring system may continuously monitor, in real-time, the fiber cable for a fiber loss change, a fiber length change, and a fiber cut based on the intensity of the backscattered light from the fiber cable. The monitoring system may continuously monitor, in real-time, the fiber cable for an abnormal event based on the differential phase change of the backscattered light from the fiber cable. The monitoring system may include a fiber-switching function to monitor multiple fiber cables, and may report issues with the fiber cables to field technicians in real-time so that the field technicians may act quickly. Thus, the monitoring system conserves computing resources, networking resources, transportation resources, human resources, and/or the like that would otherwise have been consumed in utilizing multiple devices to monitor a fiber cable, traveling to and monitoring the fiber cable, failing to identify issues with the fiber cable in real-time, recovering lost network traffic due to failing to identify issues with the fiber cable in real-time, and/or the like.

FIGS. 1A-1H are diagrams of one or more example implementations 100 described herein. As shown in FIG. 1A, a monitoring system 105 may be associated with a user device 110 and a technician operating the user device 110. Further details of the monitoring system 105 and the user device 110 are provided elsewhere herein.

As shown in FIG. 1A, multiple fiber cables (e.g., telecommunications cables, customer cables, third-party cables, utility cables, and/or the like) may be provided between sites (e.g., sites A-J) of a fiber network. The monitoring system 105 may be provided at one of the sites (e.g., site J), and may monitor fiber cables connected between site J and site B, connected between site J and site C, connected between site J and site D, connected between site J and site G, and connected between site J and site H. In some implementations, multiple monitoring systems 105 may be deployed at different sites of the fiber network to ensure simultaneous monitoring of all the fiber cables of the fiber network. In some implementations, the monitoring system 105 may be moved to different sites of the fiber network to ensure monitoring of all the fiber cables of the fiber network.

As further shown in FIG. 1A, and by reference number 115, the monitoring system 105 may receive system initialization information. For example, the technician may input the system initialization information to the user device 110 and may cause the user device 110 to provide the system initialization information to the monitoring system 105. The monitoring system 105 may receive the system initialization information from the user device 110, and may initialize the monitoring system 105 for monitoring the fiber cables connected to site J based on the system initialization information. In some implementations, the system initialization information may include information identifying the fiber cables connected to site J, a network site (e.g., site J) associated with the fiber cables, a field technician responsible for the fiber cables and/or the network site, one or more operating parameters for monitoring the fiber cables, and/or the like.

Figure 1B:
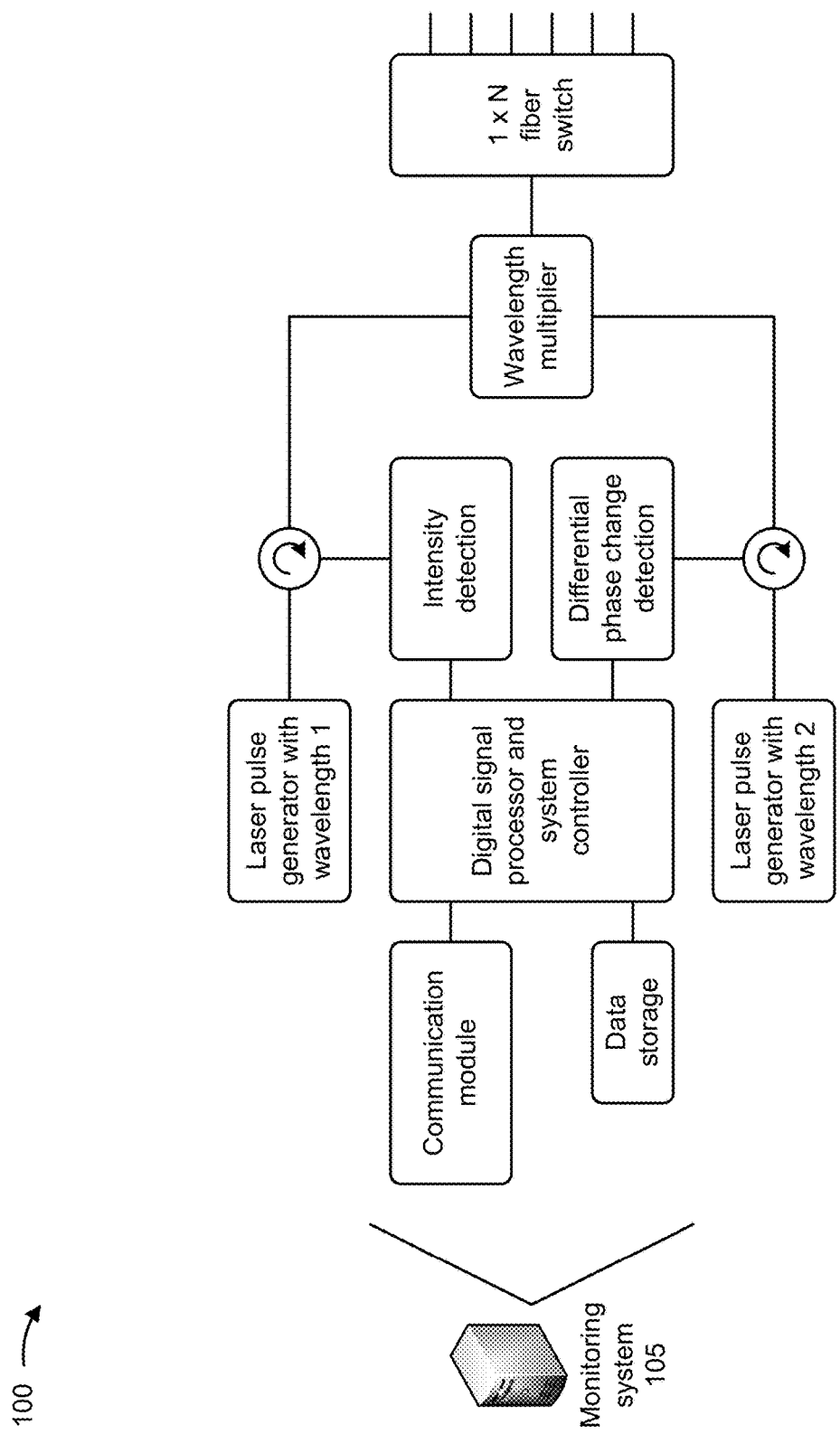

FIG. 1B depicts example components of the monitoring system 105. As shown, the monitoring system 105 may include a communication module, data storage, a first laser pulse generator with a first wavelength, a digital signal processor and system controller, a second laser pulse generator with a second wavelength, an intensity detection component, a differential phase change detection component, a wavelength multiplexer, and a fiber switch (e.g., a one-to-N fiber switch). The communication module may include a receiver, a transmitter, a transceiver, a modem, a network interface card, and/or an antenna. The communication module may enable the monitoring system 105 to communicate with the user device 110 (e.g., to receive the system initialization information from the user device 110, to report monitoring results to the user device 110), and/or the like. The data storage may include volatile and/or nonvolatile memory that stores the system initialization information, monitoring results, and/or the like in a data structure (e.g., a database, a table, a list, and/or the like).

Each of the first laser pulse generator and the second laser pulse generator may include a light-emitting diode (LED) or a laser diode that outputs an optical signal (e.g., light) with repeatable rate, delay, width, and amplitude control. The first laser pulse generator may output an optical signal with the first wavelength, and the second laser pulse generator may output an optical signal with the second wavelength, that is different that the first wavelength.

The digital signal processor and system controller may include includes a central processing unit, a graphics processing unit, a microprocessor, a controller, a microcontroller, a digital signal processor, a field-programmable gate array, an application-specific integrated circuit, and/or another type of processing component. The digital signal processor and system controller may be implemented in hardware, firmware, or a combination of hardware and software.

The intensity detection component may include an optical device that receives backscattered light based on the first wavelength of the optical signal generated by the first laser pulse generator. The intensity detection component may calculate an intensity of the backscattered light versus a distance of a fiber cable being monitored with the first wavelength of the optical signal. As described elsewhere herein, the intensity of the backscattered light versus the distance of the fiber cable may be utilized to detect a fiber loss change, a fiber length change, and/or a fiber cut associated with the fiber cable.

The differential phase change detection component may include an optical device that receives backscattered light based on the second wavelength of the optical signal generated by the second laser pulse generator. The differential phase change detection component may determine whether a differential phase change of the backscattered light occurs over a distance of a fiber cable being monitored with the second wavelength of the optical signal. As described elsewhere herein, the differential phase change of the backscattered light versus the distance of the fiber cable may be utilized to detect an abnormal event associated with the fiber cable.

The wavelength multiplexer may include an optical device that combines the optical signal with the first wavelength and the optical signal with the second wavelength to generate a mixed optical signal. The wavelength multiplexer may combine the optical signals with the first wavelength and the second wavelength so that the monitoring system 105 may monitor different properties of the fiber cable in real-time.

The fiber switch may include an optical device that splits the mixed optical signal into an N quantity of mixed optical signals, and may simultaneously provide the mixed optical signals to multiple fiber cables to be monitored by the monitoring system 105.

Figure 1C:
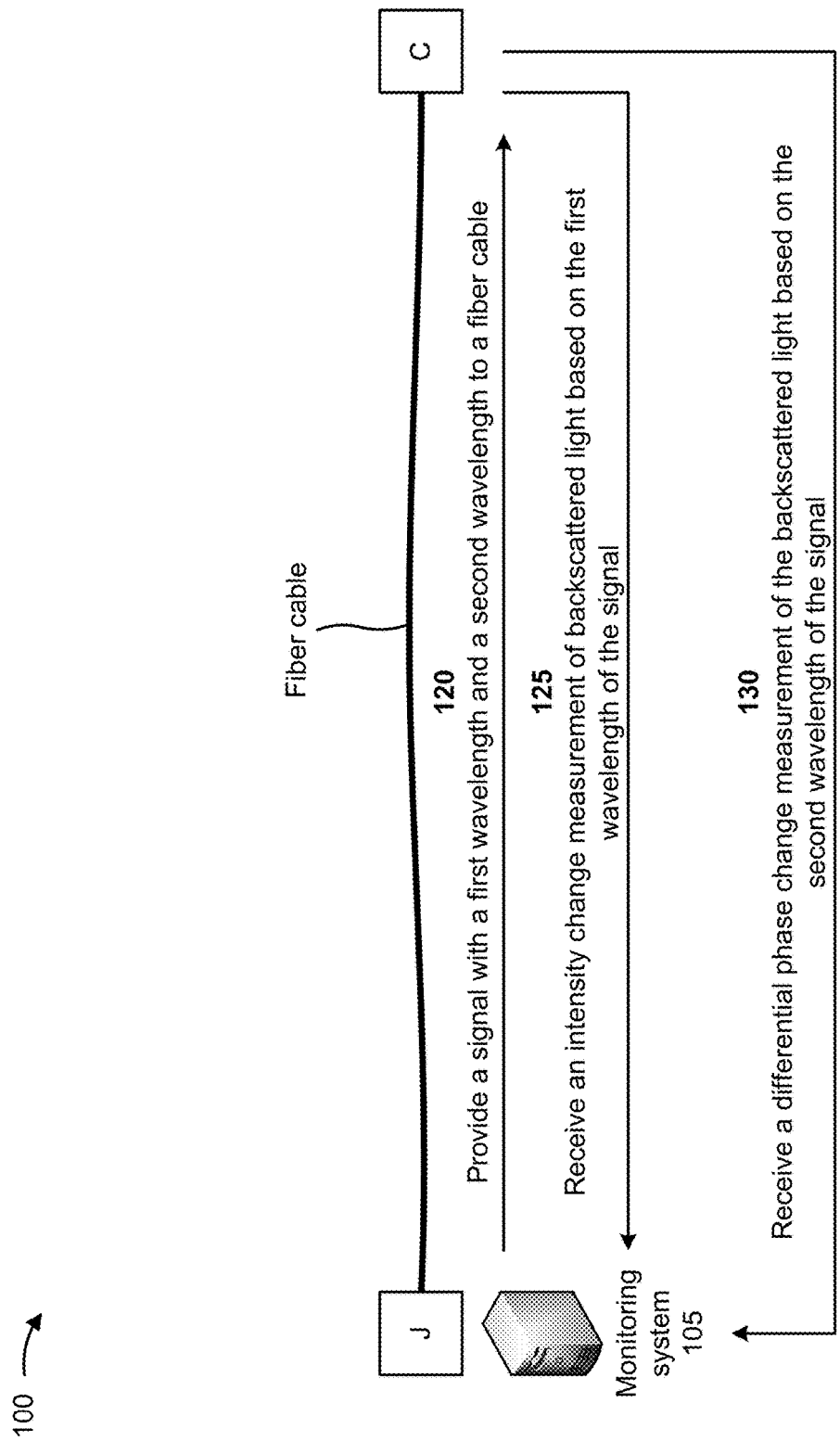

As shown in FIG. 1C, and by reference number 120, the monitoring system 105 may provide a signal with a first wavelength and a second wavelength to a fiber cable. For example, the monitoring system 105 may be connected to multiple fiber cables via the fiber switch of the monitoring system 105, and may select a fiber cable from the multiple fiber cables. The monitoring system 105 may utilize the first laser pulse generator to generate a first optical signal with the first wavelength, and may utilize the second laser pulse generator to generate a second optical signal with the second wavelength. The monitoring system 105 may utilize the wavelength multiplexer to combine the first optical signal with the first wavelength and the second optical signal with the second wavelength and to generate the signal with the first wavelength and the second wavelength. The monitoring system 105 may utilize the fiber switch to provide the signal with the first wavelength and the second wavelength to the fiber cable.

As further shown in FIG. 1C, and by reference number 125, the monitoring system 105 may receive an intensity change measurement of backscattered light based on the first wavelength of the signal. For example, provision of the signal with the first wavelength and the second wavelength to the fiber cable may cause the monitoring system 105 to receive backscattered light based on the first wavelength of the signal. The monitoring system 105 may determine an intensity of the backscattered light based on the first wavelength of the signal, and may generate an optical time domain reflectometer (OTDR) curve based on the intensity of the backscattered light and a length of the fiber cable (e.g., a distance between site J and a site connected to site J (e.g., site C) via the fiber cable). The OTDR curve may correspond to the intensity change measurement of the backscattered light based on the first wavelength of the signal. In some implementations, the monitoring system 105 may perform repeated intensity change measurements of the backscattered light based on the first wavelength of the signal to provide accurate results with very small errors (e.g., relative to a single intensity change measurement). Examples of the OTDR curve are provided below in connection with FIGS. 1D-1F.

As further shown in FIG. 1C, and by reference number 130, the monitoring system 105 may receive a differential phase change measurement of the backscattered light based on the second wavelength of the signal. For example, provision of the signal with the first wavelength and the second wavelength to the fiber cable may cause the monitoring system 105 to receive backscattered light based on the second wavelength of the signal. The monitoring system 105 may determine a differential phase change of the backscattered light based on the second wavelength of the signal, and may generate a differential phase change plot based on the differential phase change of the backscattered light and a length of the fiber cable (e.g., a distance between site J and a site connected to site J (e.g., site C) via the fiber cable). The differential phase change plot may correspond to the differential phase change measurement of the backscattered light based on the second wavelength of the signal. An example of the differential phase change plot is provided below in connection with FIG. 1G.

In some implementations, the monitoring system 105 may utilize the intensity change measurement to detect a fiber loss change, a fiber length change, and/or a fiber cut associated with the fiber cable. The monitoring system 105 may utilize the differential phase change measurement to detect an abnormal event associated with the fiber cable. The differential phase change measurement requires a different measurement technique than a measurement technique utilized for the intensity change measurement. The different measurement techniques may be integrated in the monitoring system 105 with the first laser pulse generator, the second laser pulse generator, and the wavelength multiplexer. The first laser pulse generator, the second laser pulse generator, and the wavelength multiplexer may generate the signal with the first wavelength and the second wavelength so that the different measurement techniques may be performed in parallel in the monitoring system 105.

Figure 1D:
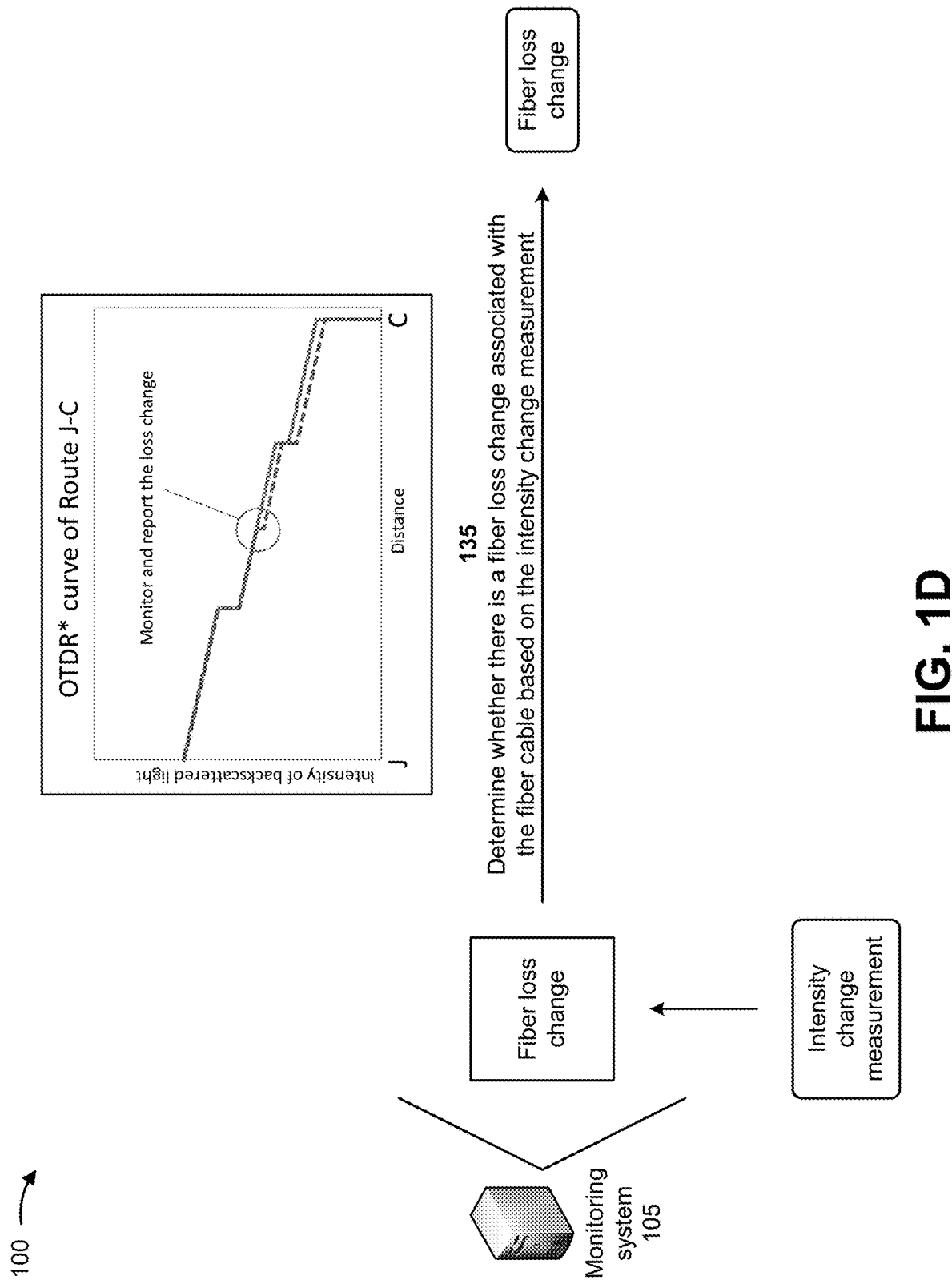

As shown in FIG. 1D, and by reference number 135, the monitoring system 105 may determine whether there is a fiber loss change associated with the fiber cable based on the intensity change measurement. For example, the monitoring system 105 may generate the OTDR curve based on the intensity of the backscattered light and the length of the fiber cable, and may determine whether there is a fiber loss change associated with the fiber cable based on the OTDR curve. In some implementations, when determining whether there is the fiber loss change associated with the fiber cable, the monitoring system 105 may determine that there is a fiber loss change associated with the fiber cable when the intensity of the backscattered light is less than a previous intensity of previous backscattered light measured for the fiber cable (e.g., if the OTDR curve based on the intensity tracks below an OTDR curve based on the previous intensity). The monitoring system 105 may determine that there is not a fiber loss change associated with the fiber cable when the intensity of the backscattered light is equivalent to the previous intensity of the previous backscattered light measured for the fiber cable (e.g., if the OTDR curve based on the intensity follows the same path as the OTDR curve based on the previous intensity).

Figure 1E:
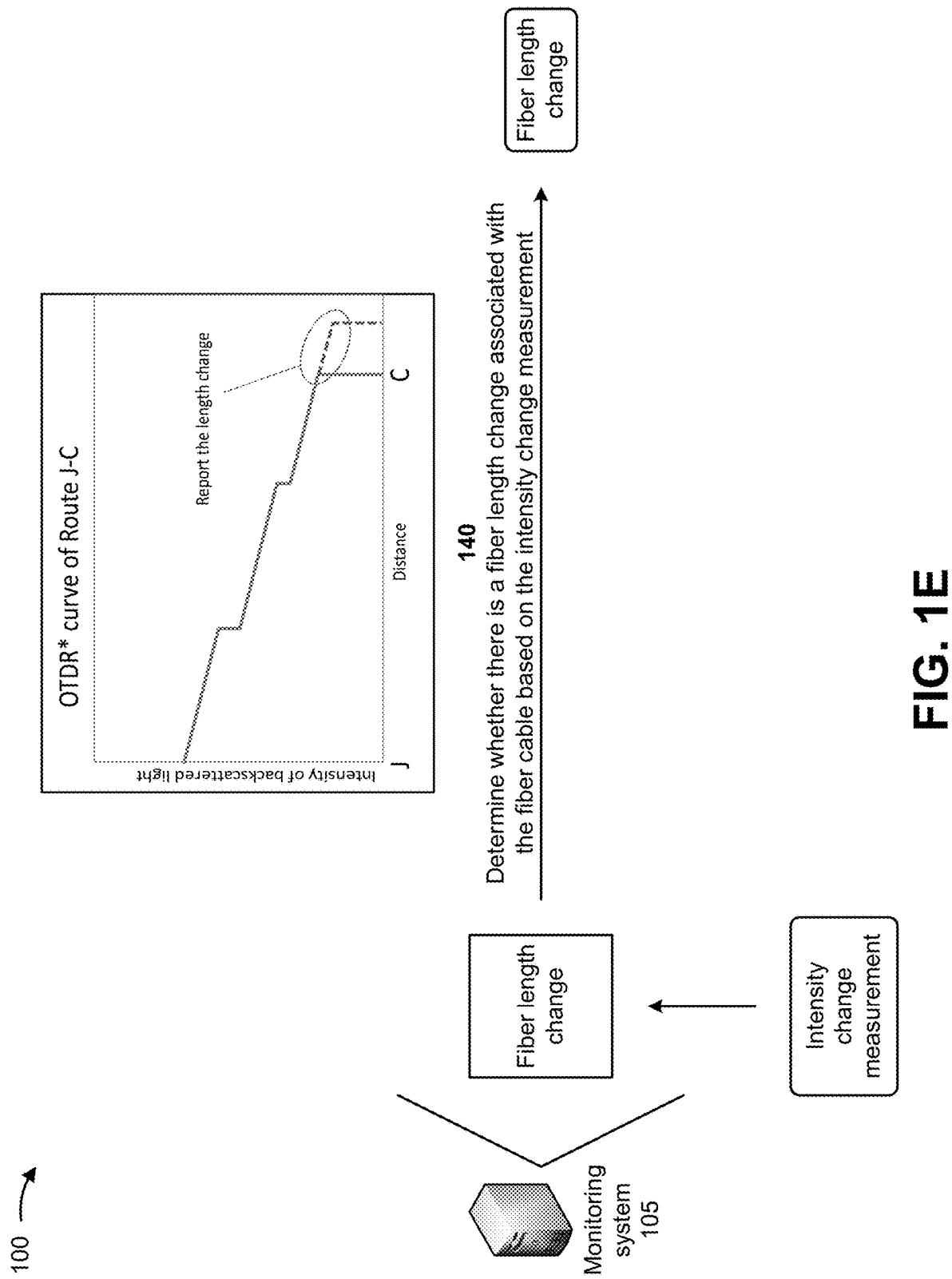

As shown in FIG. 1E, and by reference number 140, the monitoring system 105 may determine whether there is a fiber length change associated with the fiber cable based on the intensity change measurement. For example, the monitoring system 105 may generate the OTDR curve based on the intensity of the backscattered light and the length of the fiber cable, and may determine whether there is a fiber length change associated with the fiber cable based on the OTDR curve. In some implementations, when determining whether there is the fiber length change associated with the fiber cable, the monitoring system 105 may determine that there is a fiber length change associated with the fiber cable when a distance associated with the intensity of the backscattered light is greater than a previous distance associated with a previous intensity of previous backscattered light measured for the fiber cable (e.g., if the distance associated with the OTDR curve based on the intensity is greater than the previous distance associated with a previous OTDR curve based on the previous intensity). The monitoring system 105 may determine that there is not a fiber length change associated with the fiber cable when the distance associated with the intensity of the backscattered light is equal to the previous distance associated with the previous intensity of the previous backscattered light measured for the fiber cable (e.g., if the distance associated with the OTDR curve based on the intensity is equal to the previous distance associated with the previous OTDR curve based on the previous intensity).

Figure 1F:
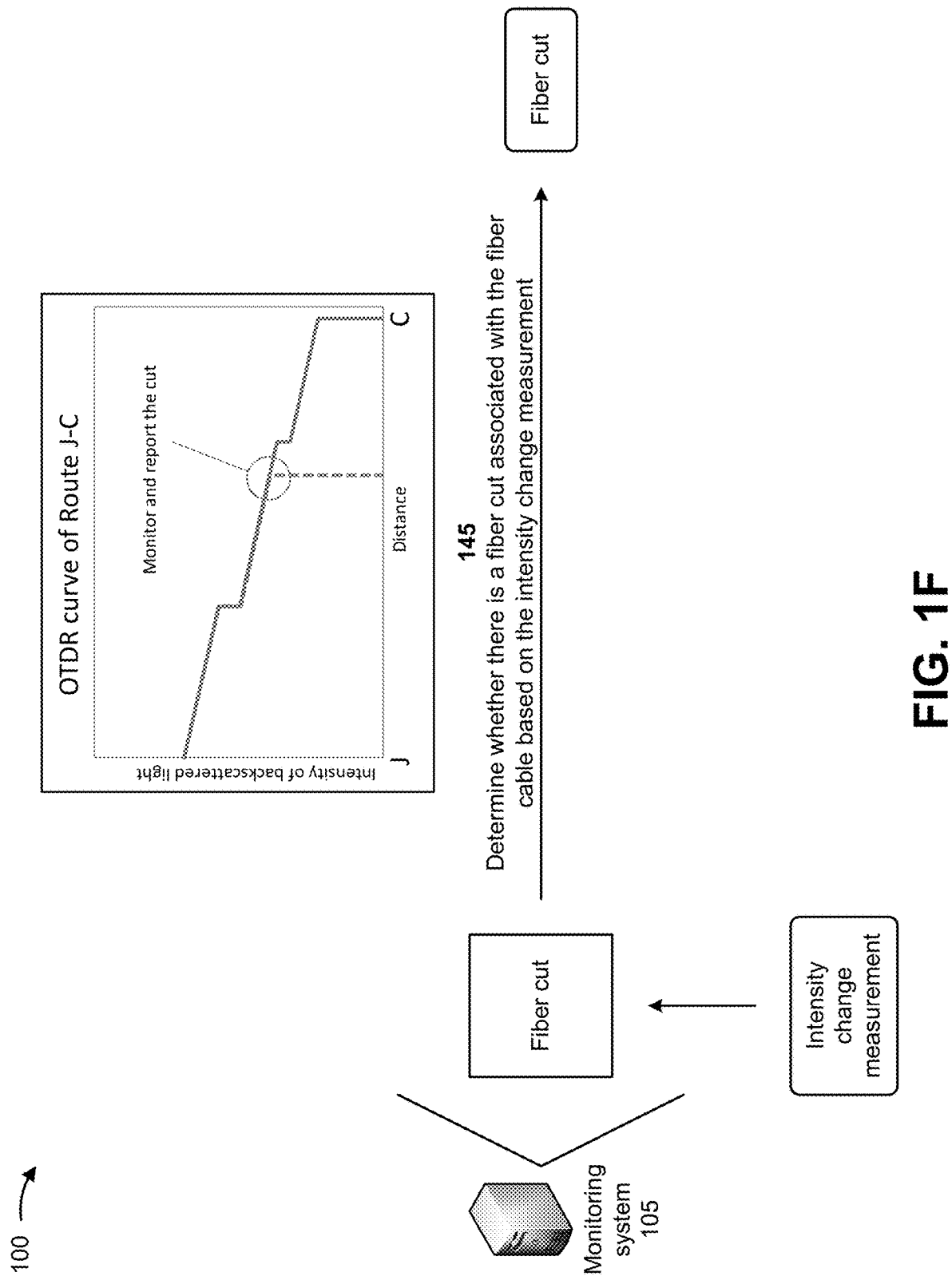

As shown in FIG. 1F, and by reference number 145, the monitoring system 105 may determine whether there is a fiber cut associated with the fiber cable based on the intensity change measurement. For example, the monitoring system 105 may generate the OTDR curve based on the intensity of the backscattered light and the length of the fiber cable, and may determine whether there is a fiber cut associated with the fiber cable based on the OTDR curve. In some implementations, when determining whether there is the fiber cut associated with the fiber cable, the monitoring system 105 may determine that there is a fiber cut associated with the fiber cable when a distance associated with the intensity of the backscattered light is less than a previous distance associated with a previous intensity of previous backscattered light measured for the fiber cable (e.g., if the distance associated with the OTDR curve based on the intensity is less than the previous distance associated with a previous OTDR curve based on the previous intensity). The monitoring system 105 may determine that there is not a fiber cut associated with the fiber cable when the distance associated with an intensity of the backscattered light is equal to the distance associated with the previous intensity of the previous backscattered light measured for the fiber cable (e.g., if the distance associated with the OTDR curve based on the intensity is equal to the previous distance associated with the previous OTDR curve based on the previous intensity).

Figure 1G:
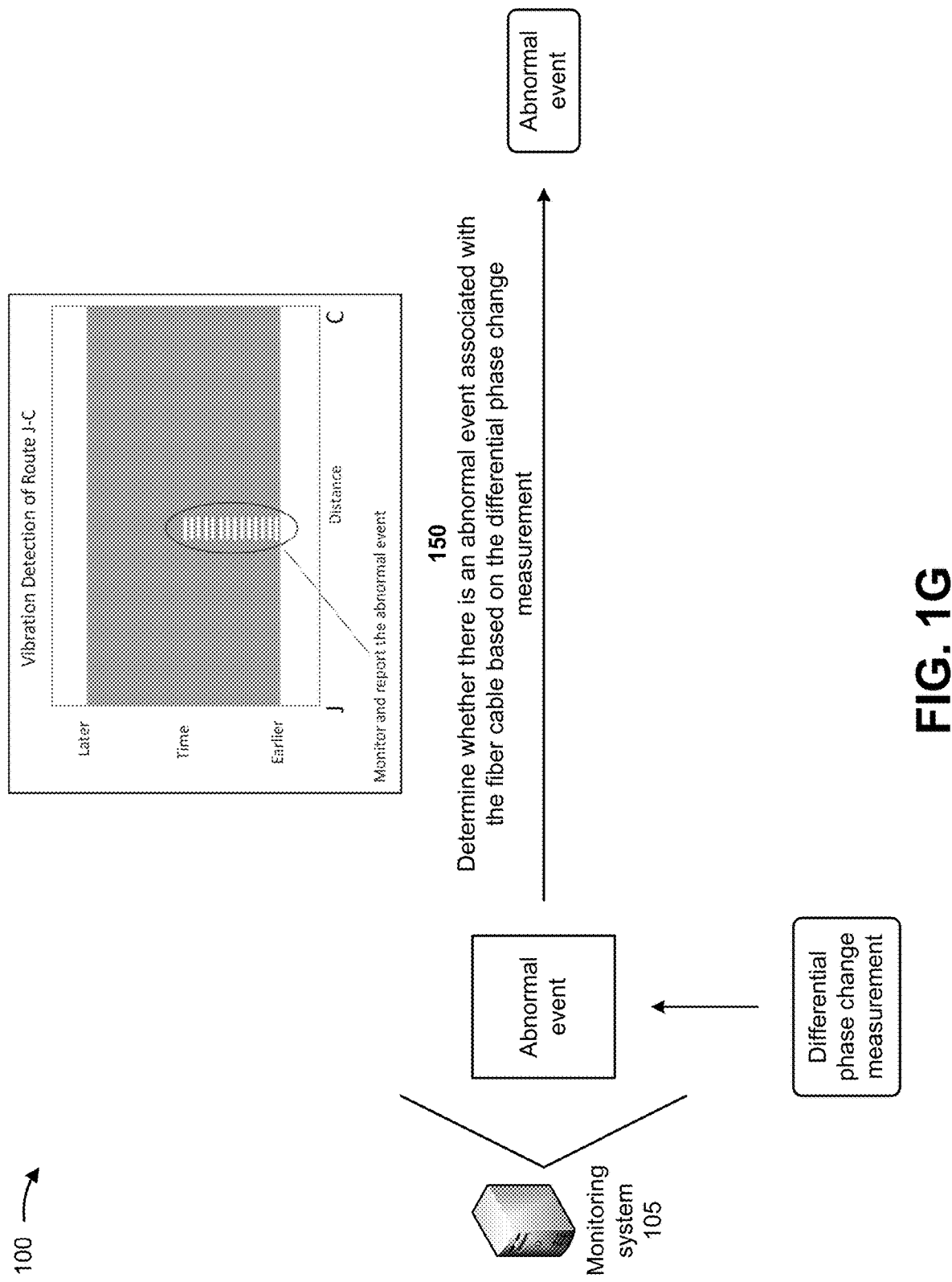

As shown in FIG. 1G, and by reference number 150, the monitoring system 105 may determine whether there is an abnormal event associated with the fiber cable based on the differential phase change measurement. For example, the monitoring system 105 may generate the differential phase change plot based on the differential phase change of the backscattered light and the length of the fiber cable, and may determine whether there is an abnormal event associated with the fiber cable based on the differential phase change plot. In some implementations, when determining whether there is the abnormal event associated with the fiber cable, the monitoring system 105 may determine that there is an abnormal event associated with the fiber cable when a differential phase change (e.g., a vibration) is detected for the backscattered light (e.g., if the differential phase change plot depicts the differential phase change for the backscattered light). The monitoring system 105 may determine that there is not an abnormal event associated with the fiber cable when a differential phase change is not detected for the backscattered light (e.g., if the differential phase change plot fails to depict the differential phase change for the backscattered light).

Figure 1H:
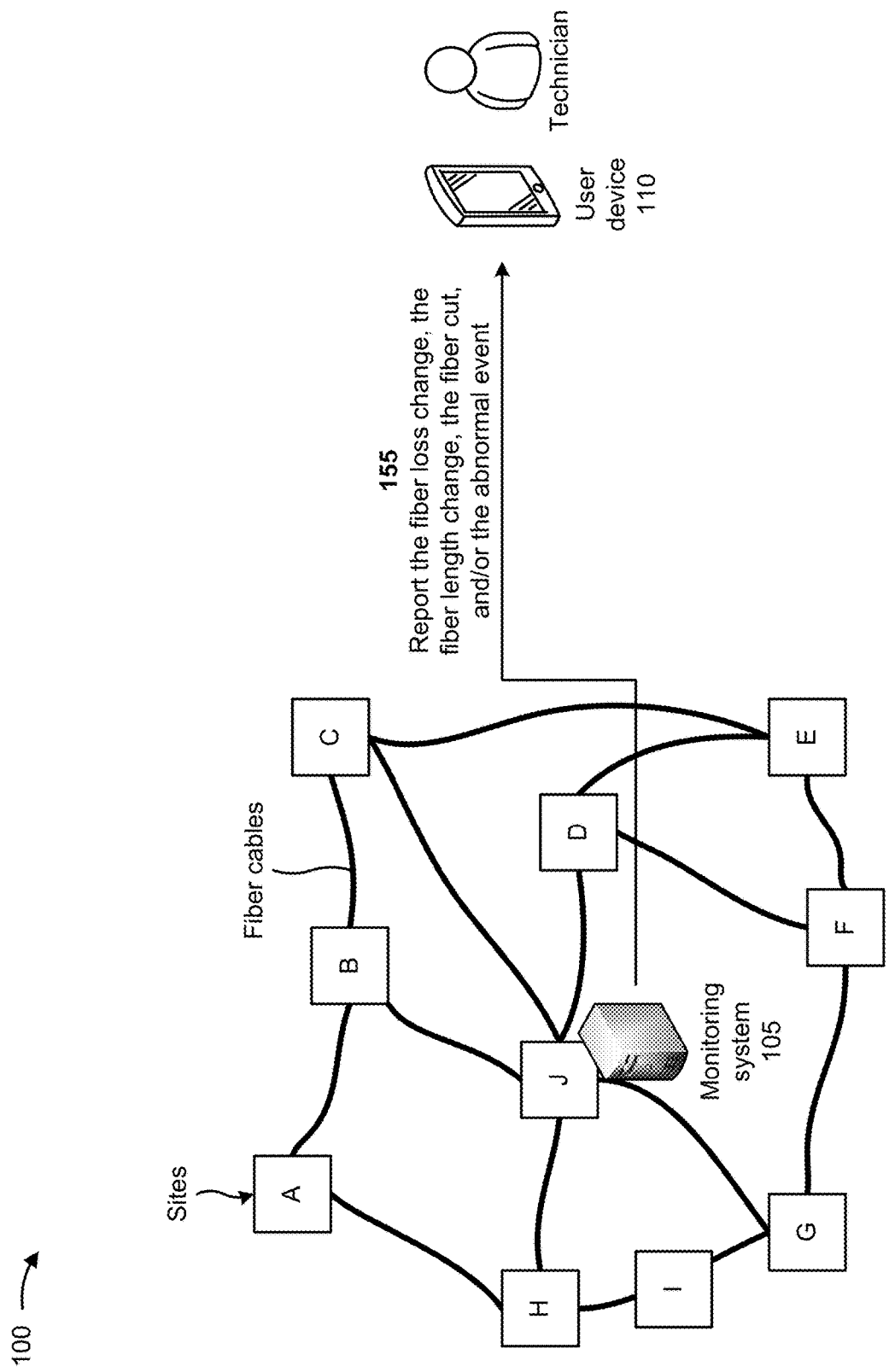

As shown in FIG. 1H, and by reference number 155, the monitoring system 105 may report the fiber loss change, the fiber length change, the fiber cut, and/or the abnormal event. For example, the monitoring system 105 may report, to the user device 110 and the technician, one or more of the fiber loss change, the fiber length change, the fiber cut, or the abnormal event when one or more of the fiber loss change, the fiber length change, the fiber cut, or the abnormal event is detected for the fiber cable. In some implementations, when reporting the fiber loss change, the fiber length change, the fiber cut, and/or the abnormal event, the monitoring system 105 may provide, to the user device 110 associated with the field technician, a notification identifying one or more of the fiber loss change, the fiber length change, the fiber cut, or the abnormal event. In some implementations, when reporting one or more of the fiber loss change, the fiber length change, the fiber cut, or the abnormal event, the monitoring system 105 may generate an audible or visual alert based on the one or more of the fiber loss change, the fiber length change, the fiber cut, or the abnormal event, and may provide the audible or visual alert to the user device 110 associated with the field technician. In some implementations, when reporting one or more of the fiber loss change, the fiber length change, the fiber cut, or the abnormal event, the monitoring system 105 may report the one or more of the fiber loss change, the fiber length change, the fiber cut, or the abnormal event in real-time relative to receiving the intensity change measurement and receiving the differential phase change measurement.

In this way, the monitoring system 105 monitors an integrity and a reliability of a network of fiber cables in real-time. The monitoring system 105 may monitor an intensity of backscattered light from a fiber cable and a differential phase change of the backscattered light from the fiber cable. The monitoring system 105 may continuously monitor, in real-time, the fiber cable for a fiber loss change, a fiber length change, and a fiber cut based on the intensity of the backscattered light from the fiber cable. The monitoring system 105 may continuously monitor, in real-time, the fiber cable for an abnormal event based on the differential phase change of the backscattered light from the fiber cable. The monitoring system 105 may include a fiber-switching function to monitor multiple fiber cables, and may report issues with the fiber cables to field technicians in real-time so that the field technicians may act quickly. Thus, the monitoring system 105 conserves computing resources, networking resources, transportation resources, human resources, and/or the like that would otherwise have been consumed in utilizing multiple devices to monitor a fiber cable, traveling to and monitoring the fiber cable, failing to identify issues with the fiber cable in real-time, recovering lost network traffic due to failing to identify issues with the fiber cable in real-time, and/or the like.

As indicated above, FIGS. 1A-1H are provided merely as examples. Other examples may differ from what was described with regard to FIGS. 1A-1H. The number and arrangement of devices and networks shown in FIGS. 1A-1H are provided as an example. In practice, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
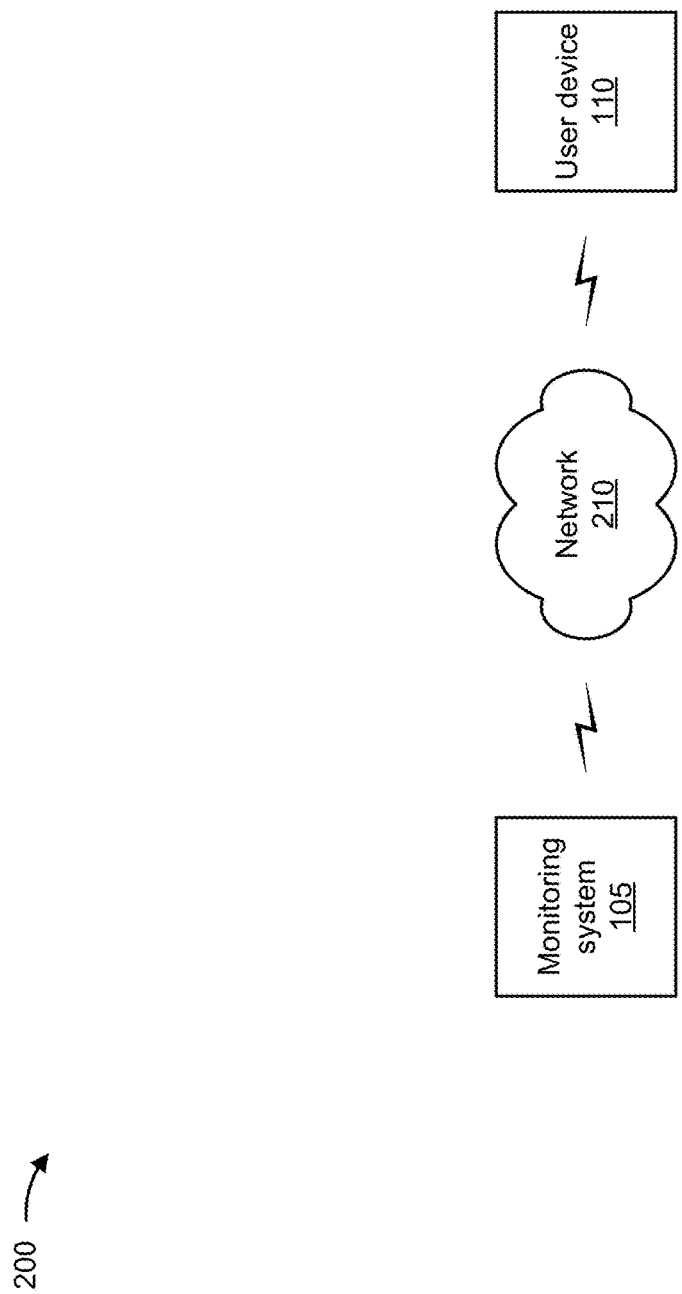
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the monitoring system 105, the user device 110, and a network 210. Devices of the environment 200 may interconnect via wired connections, wireless connections, or a combination of wired and wireless connections.

The monitoring system 105 includes one or more devices capable of receiving, generating, storing, processing, and/or providing information, such as information described herein. For example, the monitoring system 105 may include a distributed acoustic sensing device that uses a fiber cable to provide distributed strain sensing, where the fiber cable is a sensing element and vibration measurements are made using an optoelectronic device. The distributed acoustic sensing device may include a Rayleigh scattering-based distributed acoustic sensing device. The monitoring system 105 may also include or be associated with a laptop computer, a tablet computer, a desktop computer, a handheld computer, or a similar type of device that determines vibration measurements and fiber cable distances to detected vibrations. In some implementations, the monitoring system 105 may receive information from and/or transmit information to the user device 110.

The user device 110 includes one or more devices capable of receiving, generating, storing, processing, and/or providing information, such as information described herein. For example, the user device 110 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), or a similar type of device.

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
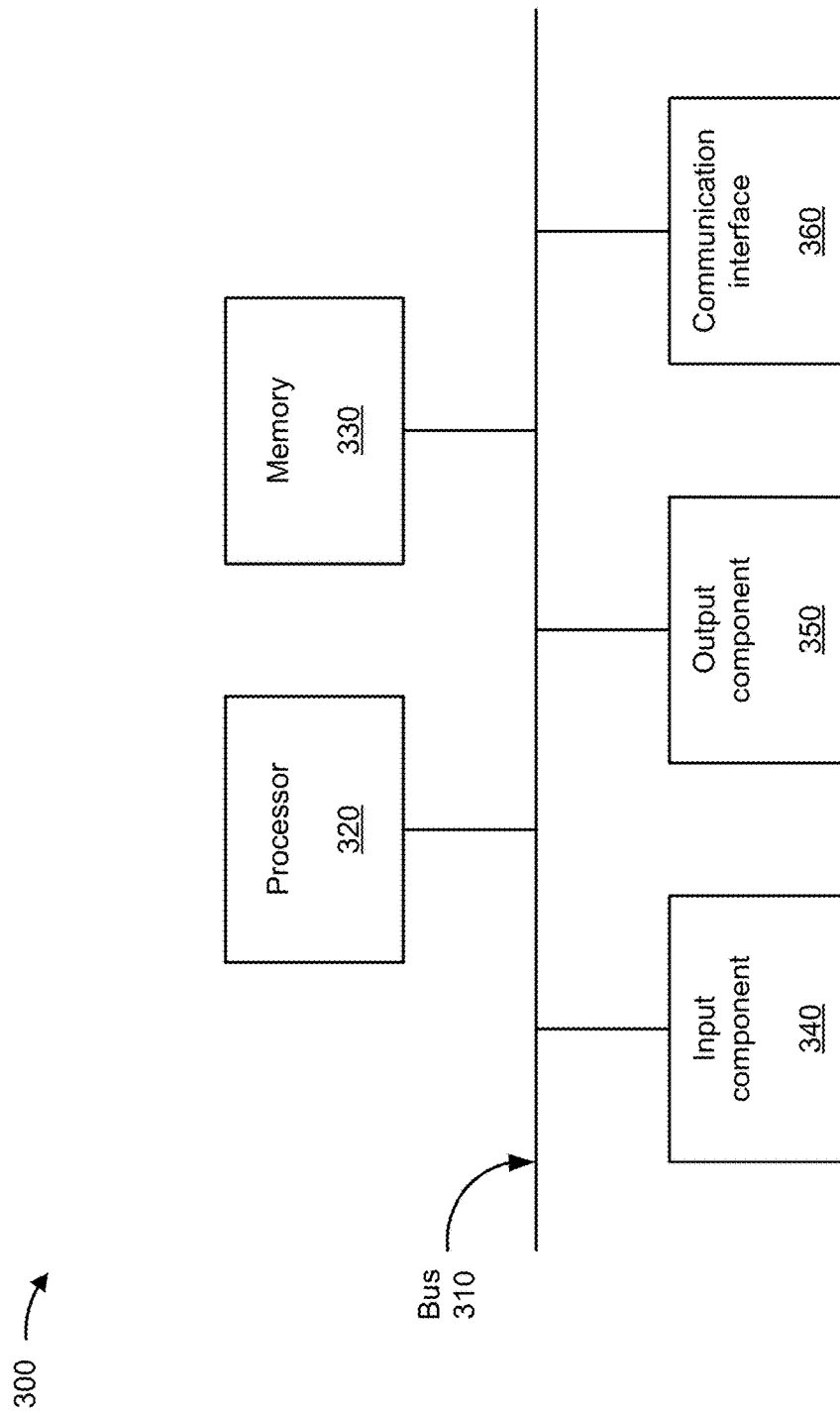
FIG. 3 is a diagram of example components of one or more devices of FIG. 2.

FIG. 3 is a diagram of example components of a device 300, which may correspond to the monitoring system 105 and/or the user device 110. In some implementations, the monitoring system 105 and/or the user device 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
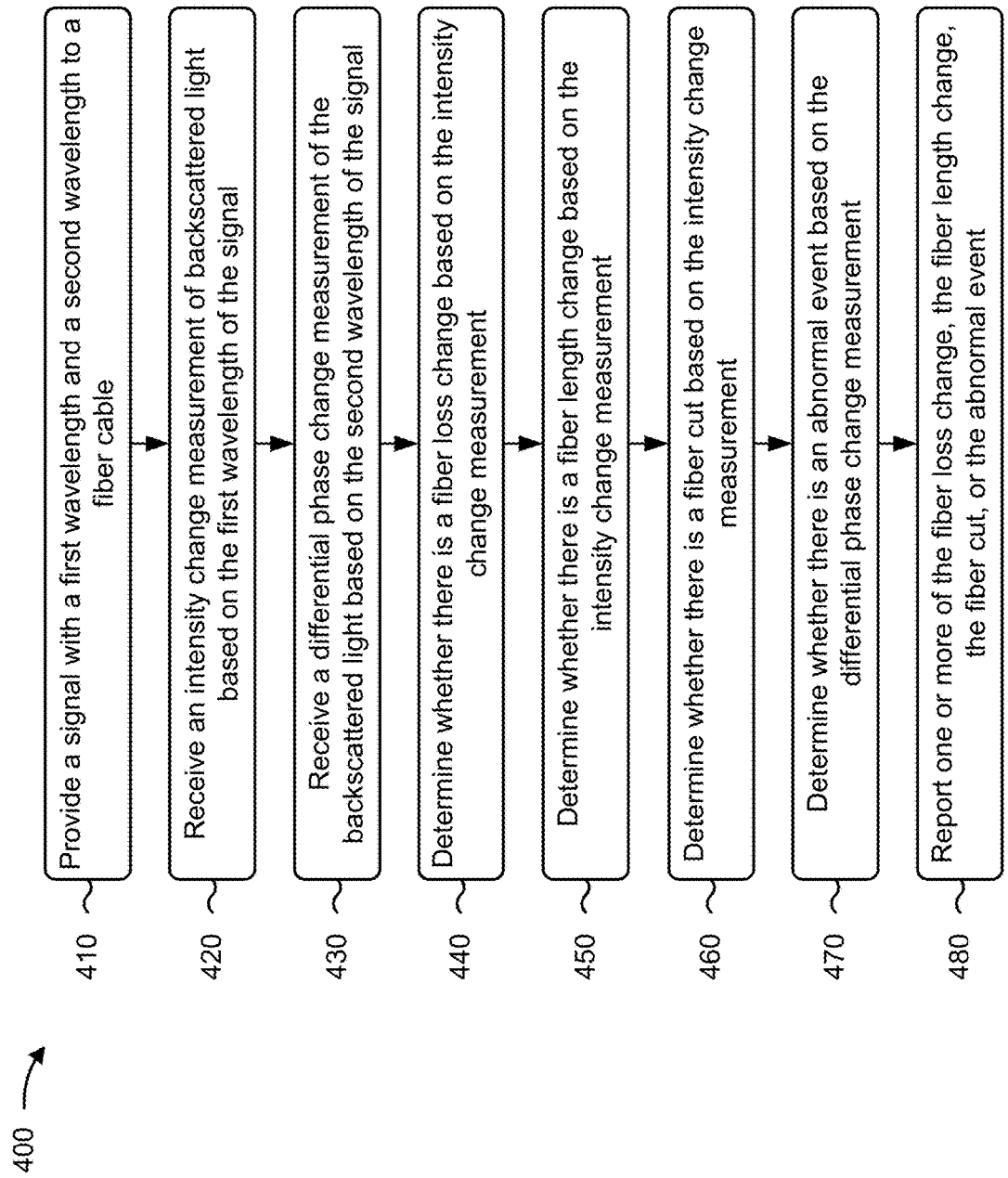
FIG. 4 is a flow chart of an example process for monitoring an integrity and a reliability of a network of fiber cables in real-time.

FIG. 4 is a flow chart of an example process 400 for monitoring an integrity and a reliability of a network of fiber cables in real-time. In some implementations, one or more process blocks of FIG. 4 may be performed by a device (e.g., the monitoring system 105). In some implementations, one or more process blocks of FIG. 4 may be performed by another device or a group of devices separate from or including the device, such as a user device (e.g., the user device 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a signal with a first wavelength and a second wavelength to a fiber cable (block 410). For example, the device may provide a signal with a first wavelength and a second wavelength to a fiber cable, as described above.

As further shown in FIG. 4, process 400 may include receiving an intensity change measurement of backscattered light based on the first wavelength of the signal (block 420). For example, the device may receive an intensity change measurement of backscattered light based on the first wavelength of the signal, as described above.

As further shown in FIG. 4, process 400 may include receiving a differential phase change measurement of the backscattered light based on the second wavelength of the signal (block 430). For example, the device may receive a differential phase change measurement of the backscattered light based on the second wavelength of the signal, as described above.

As further shown in FIG. 4, process 400 may include determining whether there is a fiber loss change based on the intensity change measurement (block 440). For example, the device may determine whether there is a fiber loss change associated with the fiber cable based on the intensity change measurement, as described above. In some implementations, determining whether there is the fiber loss change associated with the fiber cable includes determining that there is a fiber loss change associated with the fiber cable when an intensity of the backscattered light is less than a previous intensity of previous backscattered light measured for the fiber cable, and determining that there is not a fiber loss change associated with the fiber cable when the intensity of the backscattered light is equivalent to the previous intensity of the previous backscattered light measured for the fiber cable.

In some implementations, determining whether there is the fiber loss change associated with the fiber cable includes generating an OTDR curve based on an intensity of the backscattered light and a length of the fiber cable, and determining whether there is the fiber loss change associated with the fiber cable based on the OTDR curve.

As further shown in FIG. 4, process 400 may include determining whether there is a fiber length change based on the intensity change measurement (block 450). For example, the device may determine whether there is a fiber length change associated with the fiber cable based on the intensity change measurement, as described above. In some implementations, determining whether there is the fiber length change associated with the fiber cable includes determining that there is a fiber length change associated with the fiber cable when a distance associated with an intensity of the backscattered light is greater than a previous distance associated with a previous intensity of previous backscattered light measured for the fiber cable, and determining that there is not a fiber length change associated with the fiber cable when the distance associated with an intensity of the backscattered light is equal to the distance associated with the previous intensity of the previous backscattered light measured for the fiber cable.

In some implementations, determining whether there is the fiber length change associated with the fiber cable includes generating an OTDR curve based on an intensity of the backscattered light and a length of the fiber cable, and determining whether there is the fiber length change associated with the fiber cable based on the OTDR curve.

As further shown in FIG. 4, process 400 may include determining whether there is a fiber cut based on the intensity change measurement (block 460). For example, the device may determine whether there is a fiber cut associated with the fiber cable based on the intensity change measurement, as described above. In some implementations, determining whether there is the fiber cut associated with the fiber cable includes determining that there is a fiber cut associated with the fiber cable when a distance associated with an intensity of the backscattered light is less than a previous distance associated with a previous intensity of previous backscattered light measured for the fiber cable, and determining that there is not a fiber cut associated with the fiber cable when the distance associated with an intensity of the backscattered light is equal to the distance associated with the previous intensity of the previous backscattered light measured for the fiber cable.

As further shown in FIG. 4, process 400 may include determining whether there is an abnormal event based on the differential phase change measurement (block 470). For example, the device may determine whether there is an abnormal event associated with the fiber cable based on the differential phase change measurement, as described above. In some implementations, determining whether there is the abnormal event associated with the fiber cable includes determining that there is an abnormal event associated with the fiber cable when a differential phase change is detected for the backscattered light, and determining that there is not an abnormal event associated with the fiber cable when a differential phase change is not detected for the backscattered light.

As further shown in FIG. 4, process 400 may include reporting one or more of the fiber loss change, the fiber length change, the fiber cut, or the abnormal event (block 480). For example, the device may report one or more of the fiber loss change, the fiber length change, the fiber cut, or the abnormal event based on the one or more of the fiber loss change, the fiber length change, the fiber cut, or the abnormal event being associated with the fiber cable, as described above. In some implementations, reporting the one or more of the fiber loss change, the fiber length change, the fiber cut, or the abnormal event includes providing, to a user device associated with a field technician, a notification identifying the one or more of the fiber loss change, the fiber length change, the fiber cut, or the abnormal event. In some implementations, reporting the one or more of the fiber loss change, the fiber length change, the fiber cut, or the abnormal event includes generating an audible or visual alert based on the one or more of the fiber loss change, the fiber length change, the fiber cut, or the abnormal event, and providing the audible or visual alert to a user device associated with a field technician.

In some implementations, reporting the one or more of the fiber loss change, the fiber length change, the fiber cut, or the abnormal event includes reporting the one or more of the fiber loss change, the fiber length change, the fiber cut, or the abnormal event in real-time relative to receiving the intensity change measurement and receiving the differential phase change measurement.

In some implementations, process 400 includes receiving system initialization information, and initializing the device for monitoring the fiber cable based on the system initialization information. In some implementations, the system initialization information includes information identifying one or more of the fiber cable, a network site associated with the fiber cable, a field technician responsible for the fiber cable, or one or more operating parameters for monitoring the fiber cable.

In some implementations, process 400 includes generating a first signal with the first wavelength, generating a second signal with the second wavelength, and combining the first signal and the second signal to generate the signal with the first wavelength and the second wavelength.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    providing, by a device, a signal with a first wavelength and a second wavelength to a fiber cable;
    receiving, by the device, an intensity change measurement of backscattered light based on the first wavelength of the signal;
    receiving, by the device, a differential phase change measurement of the backscattered light based on the second wavelength of the signal;
    determining, by the device, whether there is a fiber loss change associated with the fiber cable based on the intensity change measurement;
    determining, by the device, whether there is a fiber length change associated with the fiber cable based on the intensity change measurement;
    determining, by the device, whether there is a fiber cut associated with the fiber cable based on the intensity change measurement;
    determining, by the device, whether there is an abnormal event associated with the fiber cable based on the differential phase change measurement; and
    reporting, by the device, one or more of the fiber loss change, the fiber length change, the fiber cut, or the abnormal event based on the one or more of the fiber loss change, the fiber length change, the fiber cut, or the abnormal event being associated with the fiber cable.

2. The method of claim 1, further comprising:
    receiving system initialization information; and
    initializing the device for monitoring the fiber cable based on the system initialization information.

3. The method of claim 2, wherein the system initialization information includes information identifying one or more of:
    the fiber cable,
    a network site associated with the fiber cable,
    a field technician responsible for the fiber cable, or
    one or more operating parameters for monitoring the fiber cable.

4. The method of claim 1, wherein determining whether there is the fiber loss change associated with the fiber cable comprises:
    determining that there is a fiber loss change associated with the fiber cable when an intensity of the backscattered light is less than a previous intensity of previous backscattered light measured for the fiber cable; and
    determining that there is not a fiber loss change associated with the fiber cable when the intensity of the backscattered light is equivalent to the previous intensity of the previous backscattered light measured for the fiber cable.

5. The method of claim 1, wherein determining whether there is the fiber length change associated with the fiber cable comprises:
    determining that there is a fiber length change associated with the fiber cable when a distance associated with an intensity of the backscattered light is greater than a previous distance associated with a previous intensity of previous backscattered light measured for the fiber cable; and
    determining that there is not a fiber length change associated with the fiber cable when the distance associated with an intensity of the backscattered light is equal to the distance associated with the previous intensity of the previous backscattered light measured for the fiber cable.

6. The method of claim 1, wherein determining whether there is the fiber cut associated with the fiber cable comprises:
    determining that there is a fiber cut associated with the fiber cable when a distance associated with an intensity of the backscattered light is less than a previous distance associated with a previous intensity of previous backscattered light measured for the fiber cable; and
    determining that there is not a fiber cut associated with the fiber cable when the distance associated with an intensity of the backscattered light is equal to the distance associated with the previous intensity of the previous backscattered light measured for the fiber cable.

7. The method of claim 1, wherein determining whether there is the abnormal event associated with the fiber cable comprises:
    determining that there is an abnormal event associated with the fiber cable when a differential phase change is detected for the backscattered light; and
    determining that there is not an abnormal event associated with the fiber cable when a differential phase change is not detected for the backscattered light.

8. A device, comprising:
    one or more processors configured to:
        receive system initialization information;
        provide, based on the system initialization information, a signal with a first wavelength and a second wavelength to a fiber cable;
        receive an intensity change measurement of backscattered light based on the first wavelength of the signal;
        receive a differential phase change measurement of the backscattered light based on the second wavelength of the signal;
        determine whether there is a fiber loss change associated with the fiber cable based on the intensity change measurement;
        determine whether there is a fiber length change associated with the fiber cable based on the intensity change measurement;

determine whether there is a fiber cut associated with the fiber cable based on the intensity change measurement;

determine whether there is an abnormal event associated with the fiber cable based on the differential phase change measurement; and report one or more of the fiber loss change, the fiber length change, the fiber cut, or the abnormal event based on the one or more of the fiber loss change, the fiber length change, the fiber cut, or the abnormal event being associated with the fiber cable.

9. The device of claim 8, wherein the one or more processors, to report the one or more of the fiber loss change, the fiber length change, the fiber cut, or the abnormal event, are configured to:

provide, to a user device associated with a field technician, a notification identifying the one or more of the fiber loss change, the fiber length change, the fiber cut, or the abnormal event.

10. The device of claim 8, wherein the one or more processors, to report the one or more of the fiber loss change, the fiber length change, the fiber cut, or the abnormal event, are configured to:

generate an audible or visual alert based on the one or more of the fiber loss change, the fiber length change, the fiber cut, or the abnormal event; and provide the audible or visual alert to a user device associated with a field technician.

11. The device of claim 8, wherein the one or more processors are further configured to:

generate a first signal with the first wavelength;

generate a second signal with the second wavelength; and combine the first signal and the second signal to generate the signal with the first wavelength and the second wavelength.

12. The device of claim 8, wherein the one or more processors, to report the one or more of the fiber loss change, the fiber length change, the fiber cut, or the abnormal event, are configured to:

report the one or more of the fiber loss change, the fiber length change, the fiber cut, or the abnormal event in real-time relative to receiving the intensity change measurement and receiving the differential phase change measurement.

13. The device of claim 8, wherein the one or more processors, to determine whether there is the fiber loss change associated with the fiber cable, are configured to:

generate an optical time domain reflectometer (OTDR) curve based on an intensity of the backscattered light and a length of the fiber cable; and determine whether there is the fiber loss change associated with the fiber cable based on the OTDR curve.

14. The device of claim 8, wherein the one or more processors, to determine whether there is the fiber length change associated with the fiber cable, are configured to:

generate an optical time domain reflectometer (OTDR) curve based on an intensity of the backscattered light and a length of the fiber cable; and determine whether there is the fiber length change associated with the fiber cable based on the OTDR curve.

15. A non-transitory computer-readable medium storing a set of instructions, the set of instructions comprising:

one or more instructions that, when executed by one or more processors of a device, cause the device to:

provide a signal with a first wavelength and a second wavelength to a fiber cable;

receive an intensity change measurement of backscattered light based on the first wavelength of the signal;

receive a differential phase change measurement of the backscattered light based on the second wavelength of the signal;

generate an optical time domain reflectometer (OTDR) curve based on the intensity change measurement of the backscattered light and based on a length of the fiber cable;

determine whether there is a fiber loss change associated with the fiber cable based on the OTDR curve;

determine whether there is a fiber length change associated with the fiber cable based on the OTDR curve;

determine whether there is a fiber cut associated with the fiber cable based on the OTDR curve;

determine whether there is an abnormal event associated with the fiber cable based on the differential phase change measurement; and report one or more of the fiber loss change, the fiber length change, the fiber cut, or the abnormal event based on the one or more of the fiber loss change, the fiber length change, the fiber cut, or the abnormal event being associated with the fiber cable.

16. The non-transitory computer-readable medium of claim 15, wherein the one or more instructions, that cause the device to determine whether there is the fiber loss change associated with the fiber cable, cause the device to:

determine that there is a fiber loss change associated with the fiber cable when an intensity of the backscattered light is less than a previous intensity of previous backscattered light measured for the fiber cable; and determine that there is not a fiber loss change associated with the fiber cable when the intensity of the backscattered light is equivalent to the previous intensity of the previous backscattered light measured for the fiber cable.

17. The non-transitory computer-readable medium of claim 15, wherein the one or more instructions, that cause the device to determine whether there is the fiber length change associated with the fiber cable, cause the device to:

determine that there is a fiber length change associated with the fiber cable when a distance associated with an intensity of the backscattered light is greater than a previous distance associated with a previous intensity of previous backscattered light measured for the fiber cable; and determine that there is not a fiber length change associated with the fiber cable when the distance associated with an intensity of the backscattered light is equal to the distance associated with the previous intensity of the previous backscattered light measured for the fiber cable.

18. The non-transitory computer-readable medium of claim 15, wherein the one or more instructions, that cause the device to determine whether there is the fiber cut associated with the fiber cable, cause the device to:

determine that there is a fiber cut associated with the fiber cable when a distance associated with an intensity of the backscattered light is less than a previous distance associated with a previous intensity of previous backscattered light measured for the fiber cable; and determine that there is not a fiber cut associated with the fiber cable when the distance associated with an intensity of the backscattered light is equal to the distance associated with the previous intensity of the previous backscattered light measured for the fiber cable.

19. The non-transitory computer-readable medium of claim 15, wherein the one or more instructions, that cause the device to determine whether there is the abnormal event associated with the fiber cable, cause the device to:
- determine that there is an abnormal event associated with the fiber cable when a differential phase change is detected for the backscattered light; and
- determine that there is not an abnormal event associated with the fiber cable when a differential phase change is not detected for the backscattered light.

20. The non-transitory computer-readable medium of claim 15, wherein the one or more instructions, that cause the device to report the one or more of the fiber loss change, the fiber length change, the fiber cut, or the abnormal event, cause the device to:
- provide, to a user device associated with a field technician, a notification identifying the one or more of the fiber loss change, the fiber length change, the fiber cut, or the abnormal event.

* * * * *